Aug. 8, 1967  R. F. STOCKTON  3,334,420
TERRESTRIAL MAGNETISM RESPONSIVE DEVICE
Filed Dec. 9, 1963  2 Sheets-Sheet 1
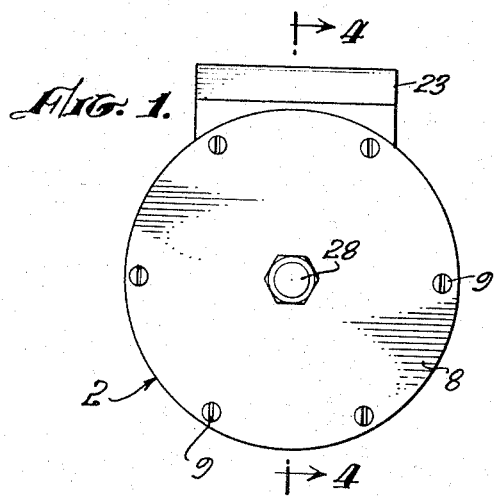
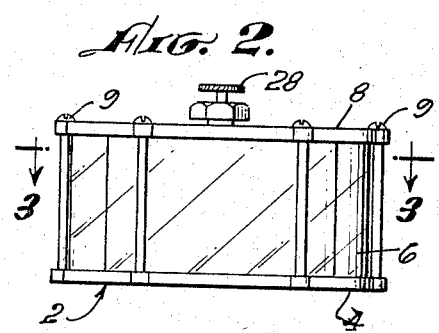
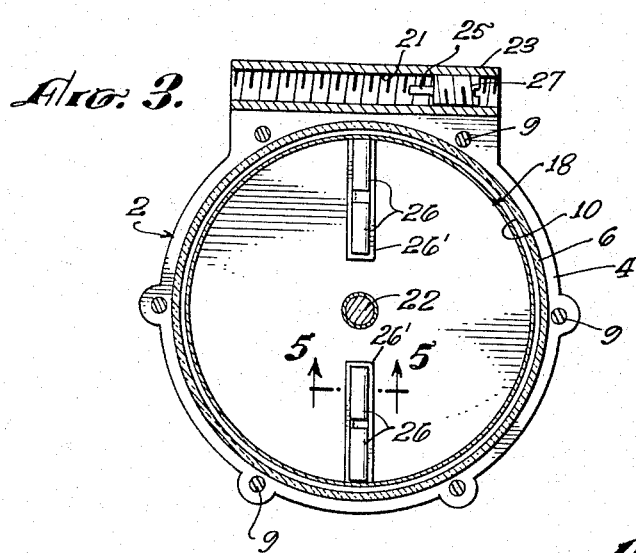
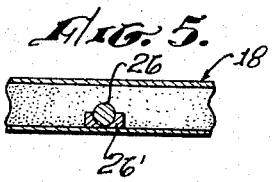
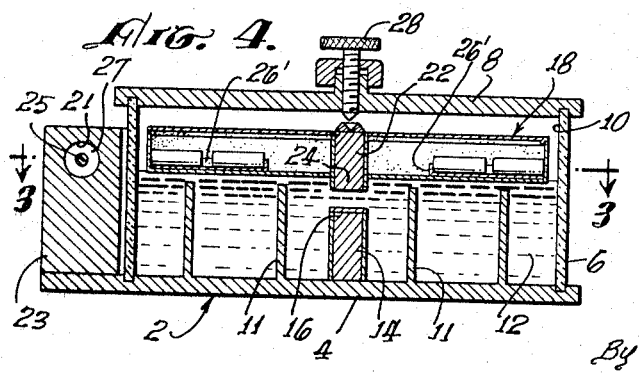
INVENTOR.
RAYMOND F. STOCKTON,
BY
Harold J LeVesconte
ATTORNEY.

Aug. 8, 1967    R. F. STOCKTON    3,334,420
TERRESTRIAL MAGNETISM RESPONSIVE DEVICE
Filed Dec. 9, 1963    2 Sheets-Sheet 2
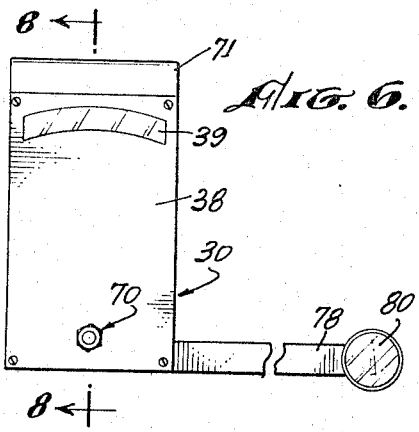
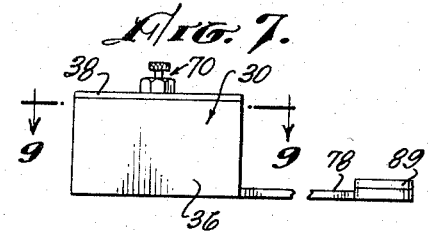
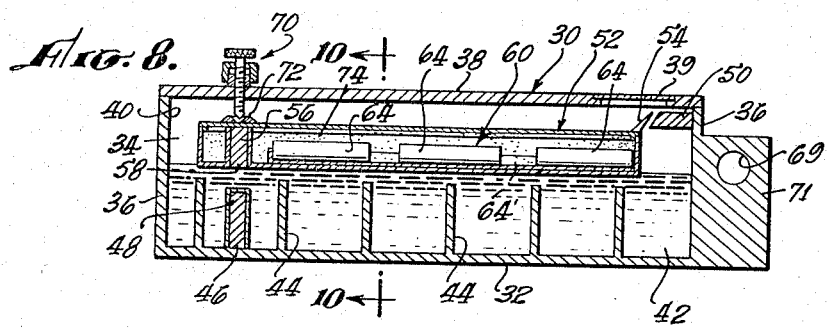
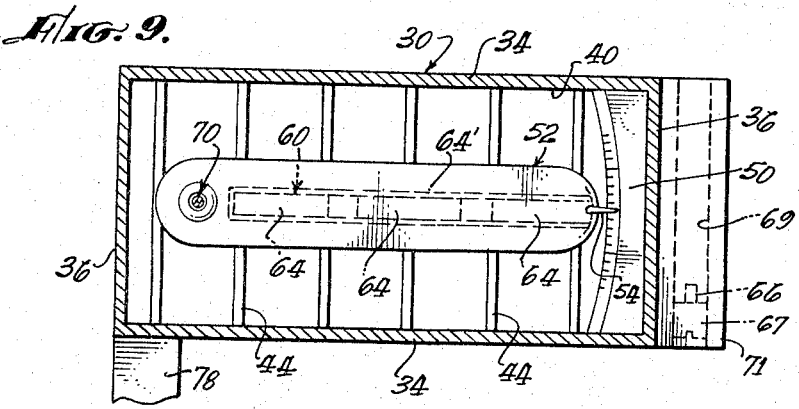
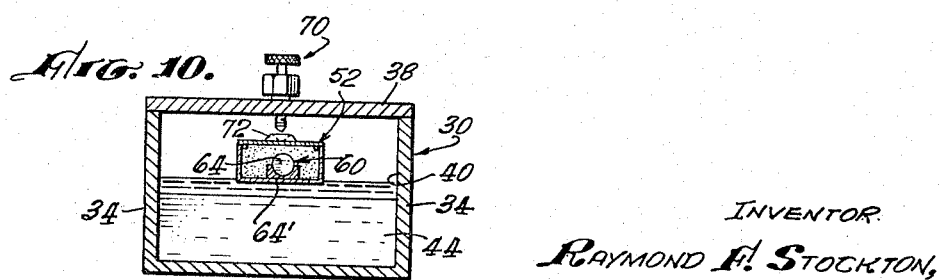
INVENTOR.
RAYMOND F. STOCKTON,
By Harold L. Vescovite
ATTORNEY.

United States Patent Office 3,334,420
Patented Aug. 8, 1967

3,334,420
TERRESTRIAL MAGNETISM RESPONSIVE DEVICE
Raymond F. Stockton, 500 W. Ave. K,
Lancaster, Calif. 93534
Filed Dec. 9, 1963, Ser. No. 328,888
8 Claims. (Cl. 33—223)

The invention relates to magnetic compass devices and more particularly to compass arrangements having a high degree of sensitivity to magnetic field influence.

Historically, the primary use of magnetic compass devices was for navigation. In more recent times magnetic devices have been effectively employed in geophysical exploration. The earth itself, of course is a large generally spherical magnet characterized by generally opposed north and south magnetic poles with a field constituting lines of force extending between said poles. The lines of force (sometimes called "meridians") are disposed generally uniformly around the earth's surface and exist in varying angular relation with the surface of the earth depending upon the latitude of a given location.

It is a well known fact that the sub-surface of the earth is composed of formations having varying physical properties in different locations. Certain types of sub-surface formations generate local magnetic force fields. It follows, and is a well known fact, that one mode of geophysical exploration employs the measuring of the variation in local magnetic force fields. With a general knowledge of influencing physical properties and with the measured magnetic variations it is possible to predict the probable geological structure of the subsurface in a given locale.

It will be apparent to those skilled in the art that, in general, the dominating magnetic influence on any locally based compass device will be the earth's magnetic meridians. The influence of any local magnetic field will depend upon the relative strength of the local field to that of the magnetic meridians as well as the sensitivity of the magnetic device used. One method of obtaining increased sensitivity of the magnetic device to local force fields has been to artificially deflect the north seeking element of the magnetic device a predetermined number of degrees to the left or right of the direction of the local lines of force of the earth's magnetic field, by subjecting said element to the influence of a permanent magnet having a force field combining with the field of the north seeking element just sufficient to effect the desired degree of deflection. The result is that a magnetic field balance is set up on the north seeking element that is extremely delicate whereby the element is subject to being easily influenced by even relatively weak local earth magnetic fields.

Other considerations affecting the sensitivity of a given magnetic device are the frictional forces introduced by the means employed to balance and pivot the north seeking element and the relative magnetic strength of the element.

With the above in mind it is a primary object of the invention to provide a magnetic compass device employing a unique bearing and pivot arrangement to thereby materially improve the sensitivity thereof in relation to devices heretofore employed in the art.

It is a further object of the invention to incorporate with the mentioned pivot arrangement a means of balancing the north seeking element which importantly reduces the effect of friction as compared to devices heretofore used and thus enhances sensitivity.

It is a further object of the invention to provide a magnetic device design incorporating an unique arrangement of permanent magnets and the interlocking magnetic fields thereof which offers a highly efficient unit for geophysical exploration.

It is yet a further object of the invention to provide a magnetic device having the additional advantage of economy and ease of manufacture.

With the foregoing principal objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a plan view of one embodiment of the invention,

FIG. 2 is a side elevational view of the structure of FIG. 1,

FIG. 3 is a sectional view taken along line 3—3 of FIG. 2,

FIG. 4 is a sectional view taken along line 4—4 of FIG. 1,

FIG. 5 is a fragmentary sectional view taken along line 5—5 of FIG. 3,

FIG. 6 is a partially fragmented plan view of an alternate embodiment of the invention, FIG. 7 is an end elevational view of the structure shown in FIG. 6, FIG. 8 is a sectional view taken along line 8—8 of FIG. 6, FIG. 9 is a sectional view taken along line 9—9 of FIG. 7, and FIG. 10 is a sectional view taken along line 10—10 of FIG. 8.

Describing the invention in detail and directing attention to FIGS. 1 through 5, it will be understood that the numeral 2 generally indicates a compass housing. The housing 2 comprises a base plate 4 and an annular transparent side element 6. The element 6 peripherally abuts and projects upwardly from the plate 4. A cover plate 8 is formed congruently with the planar configuration of the side element and the plates 4 and 8 are sealingly secured to the side element 6 to form inner cavity 10. Bolts 9, 9 may be used for device assembly. A plurality of fluid stabilizing baffle plates 11, 11 are secured to the plate 4 and project upwardly therefrom into cavity 10. In the completed assembly an appropriate fluid 12 is located in the cavity 10, the surface of the fluid being slightly above the upper edges of plates 11 as seen in elevational view. In preferred embodiments of the invention it is desirable that the fluid employed be such as to resist evaporation and freezing under normally encountered variable climatic conditions.

Centrally of the cavity 10 a first permanent bar magnet 14 is secured to the plate 4 and projects upwardly therefrom to a point below a horizontal plane containing the upper edges of the baffle plates 11. The magnet 14 may be of any transverse configuration, such as round, square, hexagonal or the like, but it will be understood that the magnetic axis thereof is arranged vertically with the upper end 16 disposed adjacent to the upper surface of the fluid.

A buoyant member 18, here shown in discoidal form and of less diameter than the cavity 10 as seen in plan view, is positioned in the cavity 10 to float on the liquid 12 out of contact with the upper edges of the baffle plates 11. The member 18 may be of any material which will float on the liquid 12 but it has been found that a thin walled case of plastic or non-magnetic metal having a heat insulating filling of plastic foam molded in situ or simply filled with a light weight insulating powder is satisfactory.

The member 18 centrally carries a vertical bar magnet 22 with the magnetic axis thereof disposed vertically and in vertical alignment with the magnetic axis of the magnet 14 and with the lower end 24 thereof of opposite polarity to the magnet end 16, and disposed adjacent to said end, It will also be noted that the level of the liquid 12 and the buoyancy of the member 18 are such that a small space exists between the adjacent ends 16 and 24 of the magnets 14 and 22. With this construction it will be understood that a magnetic force field is set up between the magnets 14 and 22 and the flux extending therebetween operates to position member 18 out of contact with the side wall defining the cavity 10. In effect the magnetic flux serves as a bearing which permits frictionless, magnetically centered rotational movement of member 18 on the fluid while the buoyancy factor resists such linear movement as would bring these magnets together.

To provide a north magnetic earth pole seeking (azimuth orienting) element, a plurality of magnetically axially aligned, elongated magnets 26 may be carried by the member 18. In this embodiment the magnetic axes of the magnets 26 is preferably arranged perpendicular to and intersecting the vertically aligned magnetic axes of magnets 14 and 22 as seen both in plan and elevational views and are secured by being cradled in troughs 26', 26' disposed within the member 18. Clamping means, such as the threadably mounted screw 28, may be carried by the plate 8 to forceably urge member 18 downwardly into abutment with the upper edges of plates 11 and thereby cage member 18 during storage and transport. Further, if the liquid level should drop to a point at which the member 18 contacts the plates, the adjacent ends of the magnets 14 and 22 are still out of contact with each other.

Attention is now directed to the numeral 21 which indicates a generally horizontal threaded aperture in the boss 23 of the housing 2 and which is disposed adjacent the outer surface of the wall element 6. It will be noted that the aperture 21 is preferably located in a horizontal plane containing the magnets 26 in their normal position as seen in elevational view (FIG. 4). A magnet 25 is carried by set screw 27, the latter being threadably received in the aperture 21 and may be rotatably positioned at any desired point therein.

When it is desired to induce deflection of the member 18 the magnet 25 is advanced until it is brought into magnetic field influence relationship with magnet 26. The magnet 25 is moved until the desired deflection is induced.

It has been found that the above described construction, and particularly the magnetic flux fluid gap bearing arrangement provides a highly sensitive virtually frictionless magnetic compass arrangement.

Attention is now directed to FIGS. 6 through 10, inclusive, wherein is illustrated yet another embodiment of the invention. It will be understood that the numeral 30 generally indicates a rectangular box-like housing having base plate 32, side plates 34 and 36 and cover plate 38. A transparent window 39 is provided in plate 38. The mentioned plates also define internal sealed cavity 40, the latter serving as a container for buoying liquid 42. A plurality of baffle plates 44, 44 are secured to the base plate 32 and project upwardly therefrom to aid in maintaining liquid stability, and to prevent the contact of magnets 46 and 56. A fixed permanent magnet 46 is secured to the base plate 32 at a point adjacent one of the plates 36, said magnet having the magnetic axis thereof disposed vertically and terminating in an upwardly facing pole end at 48. An indicating scale 50 having desired incremental divisions thereon is secured to the inner face of the other plate 36 and is arranged to be visible through transparent window 39.

A buoyant member is again provided and indicated generally by the numeral 52. The buoyant member 52 is here shown as an elongated, rectangular box-like element carrying an indicating pointer 54 on one end thereof in readable relationship with scale 50. The member 52 carries a permanent magnet 56 disposed with the magnetic axis thereof extending vertically and terminating in a pole end 58 disposed in vertically aligned liquid gap relationship with pole end 48. The pole ends 48 and 58 are of opposite polarity whereby the interlocking magnetic flux field positions the member 52 accommodating frictionless oscillatory movement thereof about the axis defined by the magnetic axes of the magnets 46 and 56.

Magnetic means, indicated generally at 60, are provided to offer a north magnetic earth pole seeking arrangement. In this embodiment the magnetic axis of the magnetic means 60 is carried by the member 52 in perpendicular relationship to the axis defined by the magnets 46 and 56. Considering FIGS. 8 and 9, it will be noted that the magnetic means 60 is preferably formed of a plurality of spaced bar magnets 64, 64. It will be understood that the poles of the magnets 64 of like polarity are cradled in a trough 64' facing in a common direction. Thus poles of unlike polarity are in adjacent relationship. For example, the north poles of the magnets 64 are all directed to the right as seen in FIG. 8. As a result of this construction, magnetic fields are set up between the poles of unlike polarity in adjacent relationship as well as secondary fields between poles of unlike polarity in opposed directional relationship. Noting that the magnetic flux meridians extend from the north earth magnetic pole to the south earth magnetic pole, it will be apparent that the magnetic flux extending between adjacent magnetic poles of magnets 64 is directed in opposition to the earth magnetic flux.

As earlier noted, when magnetic devices are used in geophysical exploration, it is desirable to artificially deflect the magnetic north indicating member. For this purpose, a permanent magnet 66 may be mounted in an adjustable screw element 67, the latter being threadably carried in threaded aperture 69. The aperture 69, preferably, is formed in the boss 71 of the housing 30, and, in reasonably close juxtaposition to the movable pointer end of member 52 as seen in plan and elevational views. The magnet 66 may be either in attracting or repelling relationship with the magnet means 60, depending upon the desired direction of deflection of member 52. The relative strength of the flux field set up between the magnet 66 and magnetic means 60, as determined by the respective strengths of the magnets and the separation distance therebetween, will determine the degree of deflection of member 52.

Screw means 70 is threadably carried by the plate 38 and projects therethrough. Member 52 is provided with a seat 72 which may receive the projected end of the screw means 70, so that said member may be forceably caged downwardly against the upper edges of plates 44 during device storage and transport.

Directing attention to FIGS. 8 and 10, it will be seen that the member 52 is hollow and carries the magnetic means 60 along the lower portion thereof. In a preferred embodiment of the invention, the remainder of the total volume of member 52 is filled with an insulating material indicated at 74. By thus insulating the magnet means 60, the effect of temperature variation therein is reduced thus tending to maintain a relatively uniform magnetic field even under conditions of climatic temperature variation.

Returning to FIGS. 7 and 8, it will be seen that the housing 30 has a bar 78 secured to one end thereof. The bar 78 extends outwardly from the housing 30 and mounts a conventional needle compass 80 on the end thereof. The bar 78 should be of such length that the compass 80 is out of field influence of the magnets carried within the housing 30. Because of this relationship, the compass 80 will advise the device operator of true magnetic north even under conditions of artificial deflection of member 52 as hereinabove described.

While in the foregoing specification there has been described a presently preferred embodiment of the invention, it will be understood that such disclosure is by way of example, and it will be understood that the invention includes as well, all such modifications and changes in the parts, and in the construction, combination and arrangement of parts as shall come within the purview of the appended claims.

I claim:
1. In a magnetic compass arrangement, a housing structure including fixed magnetic means establishing a vertically disposed magnetic axis in fixed relation to said housing, an earth magnetic pole seeking element movably carried by the housing including magnetic means fixed to said element establishing a vertically disposed magnetic axis and combining attractionally with said fixed magnetic means to constitute a bearing means, a fluid disposed in said housing on which said earth magnetic pole seeking element is buoyantly supported at such level that the respective magnetic means constituting said bearing are held in spaced relationship by said buoyant support of said element and accommodate pivotal movement of the element in the housing about the axial line established by said vertical axes.

2. A magnetic compass arrangement according to claim 1, wherein said element includes other magnet means arranged with the magnetic axis thereof disposed in a substantially right angle relationship with the magnetic axes of the magnetic means which constitute the said bearing means.

3. A magnetic compass arrangement according to claim 2, and including second magnet means carried by the housing disposed in magnetic field relationship with the pole seeking element to induce deflection thereof, said second magnet means being adjustable on said housing with resultant variable deflection of said element from alignment with the earth magnetic field to a desired extent.

4. In a magnetic device arrangement, a housing, fluid disposed in the housing, a buoyant member floated upon the fluid in said housing, magnet means carried by the buoyant member and operative to align the buoyant member with the earth magnetic field, means to accommodate movement of the buoyant member in the housing about a vertical axial line, said last mentioned means comprising a first vertical axis magnet means carried by the housing and a second vertical axis magnet means carried by said buoyant member and maintaining sufficient attractional magnetic field engagement with the first vertical axis magnet means to provide a pivotal axis.

5. A magnetic device arrangement according to claim 4, in which said housing includes baffle plate means disposed in the liquid supporting said element, and in which said housing carries screw means operable to clamp said element against said baffle means.

6. A magnetic device arrangement according to claim 4, and including a magnet carried by said housing and adjustable thereon for movement into desired magnitudes of magnetic influence with said first mentioned magnet means with resultant artificial deflection of said member to a desired amount from alignment with the earth magnetic field to which it is responding.

7. A magnetic compass device according to claim 4, wherein the adjacent pole ends of said first and second vertical axis magnet means are two in number, one of said two magnet means being carried by the housing and having a pole thereof disposed below the surface of the fluid in said housing.

8. A magnetic compass device according to claim 7, and including magnetic means operable to deflect said first magnet means to desired variable extends from alignment with the earth magnetic field, a plurality of baffle plates carried by the housing and disposed in angular relation to the horizontal, the upper edges of said baffle plates being below the surface of said liquid and extending above the pole end of said magnet carried by the housing to such extent that the adjacent pole ends of said first and second vertical axis magnets are maintained in a spaced relationship when said buoyant member is in contact with said baffle plates.

References Cited

UNITED STATES PATENTS

| | | | |
|---|---|---|---|
| 167,452 | 9/1875 | Iles | 33—225 |
| 1,435,633 | 11/1922 | Eisenmann | 33—222.5 |
| 2,153,565 | 4/1939 | Isaacson | 33—223 |
| 2,192,138 | 2/1940 | Langsner | 33—222.5 |
| 2,202,154 | 5/1940 | Kollsman | 33—223 |
| 2,446,568 | 8/1948 | Wolfe | 33—223 X |
| 2,556,199 | 6/1951 | Lee | 33—222.6 X |
| 2,638,683 | 5/1953 | Reece et al. | 33—222.5 |

FOREIGN PATENTS

| | | |
|---|---|---|
| 544,937 | 7/1922 | France. |
| 859,963 | 12/1952 | Germany. |
| 270,663 | 1/1930 | Italy. |
| 271,720 | 2/1930 | Italy. |

ROBERT B. HULL, *Primary Examiner.*